No. 628,879. Patented July 11, 1899.
P. C. WARING.
FEEDING AND WEIGHING MACHINE.
(Application filed Jan. 3, 1899.)

(No Model.) 2 Sheets—Sheet 1.

WITNESSES:
M. Henry Wurtzel
O. Fast

INVENTOR
Pierre C. Waring
BY
Graus & Raegener
ATTORNEYS.

THE NORRIS PETERS CO., PHOTO-LITHO., WASHINGTON, D. C.

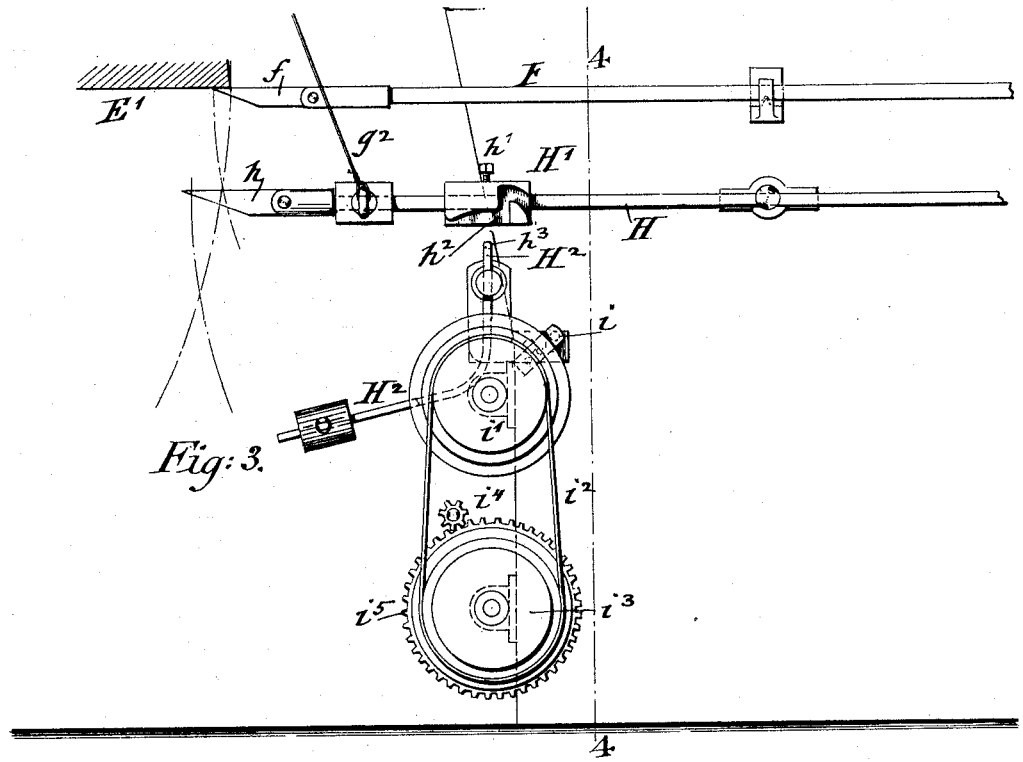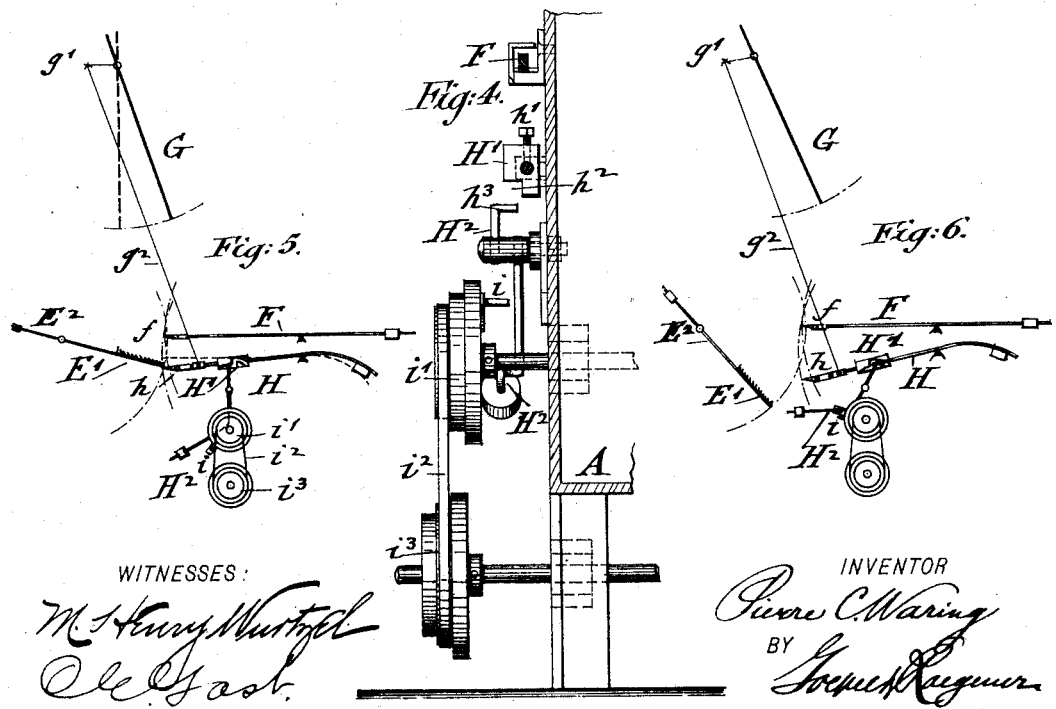

UNITED STATES PATENT OFFICE.

PIERRE C. WARING, OF YONKERS, NEW YORK.

FEEDING AND WEIGHING MACHINE.

SPECIFICATION forming part of Letters Patent No. 628,879, dated July 11, 1899.

Application filed January 3, 1899. Serial No. 700,899. (No model.)

*To all whom it may concern:*

Be it known that I, PIERRE C. WARING, a citizen of the United States, residing in Yonkers, in the county of Westchester and State of New York, have invented certain new and useful Improvements in Feeding and Weighing Attachments for Hat-Making and other Machines, of which the following is a specification.

This invention relates to an improved feeding and weighing attachment for hat-making and other machines in which a determined quantity of fur, wool, or other fibrous material is weighed off and fed forward at such predetermined periods of time as may be necessary for the proper working of the hat-making or other machine to which it is attached, the improvements being designed with a view of interrupting the supply of fibrous material as soon as the required quantity is supplied and returning said fibrous material to the main hopper of the feeder during the time between the complete weighing of the determined quantity of fibrous material and the expiration of the predetermined interval when it is to be delivered to the machine, after which the parts are restored to their normal position ready for the next weighing operation.

My invention consists of a feeding and weighing mechanism for hat-making and other machines in which the feeding and weighing mechanisms are operated in combination with an oscillating deflector that returns the fibrous material to the feed-hopper upon the weighing of a predetermined quantity of material.

The invention consists, further, of the combination, with the feeding and weighing mechanisms, of an oscillating deflector and means for actuating it at the proper time, so that the supply of fibrous material to the weighing device is interrupted and the material returned to the feed-hopper until the charge is delivered and the movable part of the weighing device returned to its normal position.

The invention consists, further, of certain details in the construction of the deflector and its operating mechanism and the means for positively moving the deflector, as will be fully described hereinafter and finally pointed out in the claims.

Figure 1:
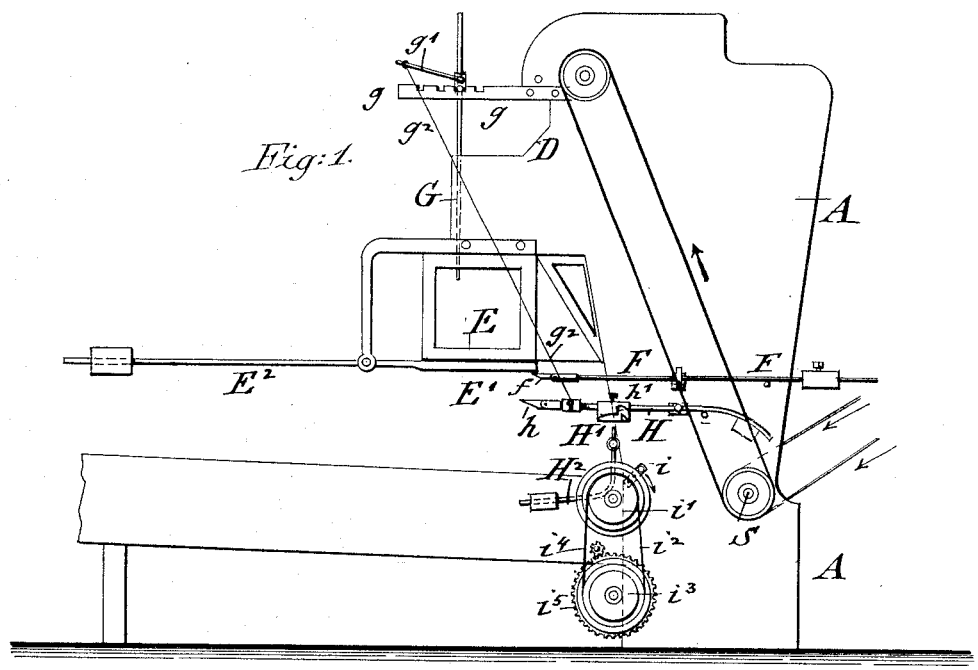
Figure 2:
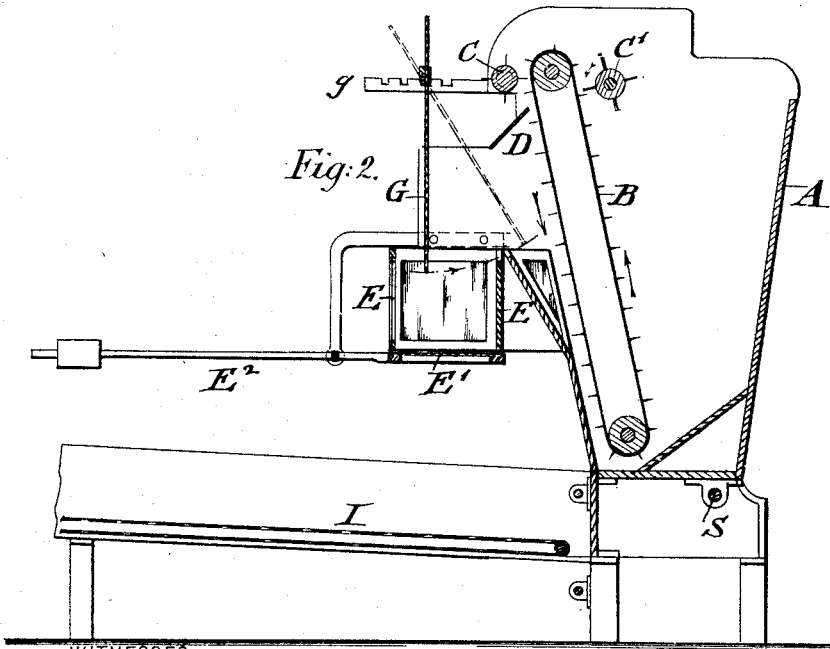

In the accompanying drawings, Figure 1 represents a side elevation of my improved feeding and weighing attachment for hat-making and other machines. Fig. 2 is a vertical longitudinal section of the same. Fig. 3 is a detail side view showing the mechanism for operating the deflector, drawn on a larger scale. Fig. 4 is an end elevation of the same, partly on line 4 4, Fig. 3; and Figs. 5 and 6 are diagrams showing the different positions of the deflector and its operating parts.

Similar letters of reference indicate corresponding parts.

Referring to the drawings, A represents the feed-hopper of my improved feeding and weighing attachment for hat-making and other machines. In the feed-hopper A is arranged an endless belt or apron B, provided with projecting pins, by which the fur or other fibrous material which is supplied to the hopper is fed to the weighing device. Rotary motion is imparted to the endless feed-belt B by a belt-and-pulley transmission from the driving-shaft S. The fur or other fibrous material is cleared from the supply-apron by a clearing-roller C and wiper C', by which the material is conducted over an inclined plate D into the box E of the weighing device. The box E is open at the bottom and closed by a movable platform E', which is applied to a fulcrumed end-weighted lever $E^2$. The platform E' is held in normally-closed position below the box E by a finger $f$ at the end of a fulcrumed and weighted lever F, which swings on knife-edges and the weight of which is so adjusted that the required quantity of fibrous material is weighed off. The finger $f$ is pivoted to the front end of the counterbalancing-lever F and tapered at its lower end, so that the platform E' can return into its normal closed position after delivering the quantity of fibrous material weighed thereon, the finger giving sufficiently to permit the passage of the platform below the box E, so as to close the same, as shown in Fig. 1.

The parts so far described are well known, and I do not claim the same.

The novel feature of my present invention consists in the arrangement of a deflecting mechanism, by which the supply of fibrous material to the weighing device is interrupted and the fibrous material returned into the feed-hopper as soon as the required quantity is weighed off, the return of the fibrous material to the feed-hopper being kept up while the quantity weighed off is being delivered to the hat-forming cone or other mechanism and until the platform of the weighing device is returned into its normal position at the lower end of the weighing-box E.

It is evident that the supply-stream of fibrous material will vary in volume according to the greater or smaller quantity that is in the feed-hopper and also that the supply-stream is heavier when a fresh supply of fibrous material is put in the feed-hopper than when it has been more or less broken in smaller pieces by the working it receives in the feed-hopper and the action of the wiper therein. It is furthermore evident that the natural result of a supply-stream of an uninterrupted continuous and constantly-varying volume would be the varying of a desired quantity of material at irregular intervals and the desired quantity of material would be only approximately correct.

The object of this invention is to provide an attachment for those machines operating on fibrous material which require an absolutely accurate quantity of material to be delived only at predetermined intervals. The important point is that the delivery of the accurately-weighed fibrous material should be timed properly for the machine, so as to be worked up by the machine to which it is applied. This is accomplished by arranging in connection with the feeding and weighing devices an automatically-operated deflector G, which is fulcrumed in a notched arm $g$ above the weighing-box E and extended in downward direction into the upper part of the box, as shown in Figs. 1 and 2. The pivot of the deflector G is provided with a crank-arm $g'$, which is connected by a cord $g^2$ with a fulcrumed counterbalancing-lever H, located below the counterbalanced weighing-lever E and provided at its end with a pivoted finger $h$. On the shank of the lever H is arranged a grooved block H', which can be adjusted by a set-screw $h'$ on the shank of the lever H, said block H' being provided with a side groove $h^2$, that is engaged by an inwardly-bent end $h^3$ of a fulcrumed and weighted lever $H^2$, which is arranged on the side of the feed-hopper below the block H', as shown clearly in Fig. 3. The fulcrumed lever $H^2$ is intermittently engaged by a pin $i$, that is carried by a pulley $i'$, which is located below the fulcrumed lever $H^2$ and which is driven by a belt-and-pulley transmission $i^2 \, i^3$, which receives motion from a pinion $i^4$ and gear-wheel $i^5$, as shown in Figs. 1 and 3. The pinion is placed on the shaft of the conveyer I, on which the fibrous material is discharged from the weighing-platform E'.

The operation of my improved deflecting attachment is as follows: As soon as the quantity of fibrous material which is to be weighed off is fed to the weighing device the platform E' is dropped past the end of the counterbalancing-lever F and passed on to the projecting finger $h$ of the fulcrumed lever H, which extends more into the path of the platform E' than the finger $f$ of the weighted lever F. The platform E' moves the lever H immediately in downward direction until the projecting portion of the block H' abuts against the upper inwardly-bent end of the lever $H^2$, as shown in Fig. 5. By the downward motion of the lever H the deflector G is oscillated from its vertical position into the inclined position, as shown in full lines in Fig. 5, so that the supply-stream of fibrous material is not delivered into the weighing-box E, but deflected instantly into the feed-hopper A, as shown by the arrow in Fig. 2. The weighted lever H rests on the end $h^3$ of the lever $H^2$ until the pin $i$ on the pulley $i'$ engages the lower part of the lever $H^2$ and lifts the latter, so that the upper end $h^3$ moves into the grooved portion of the block H', by which the immediate release of the weighing-platform E' is produced and the quantity weighed off delivered to the conveyer I. Simultaneously therewith the weighted lever H is retained by the weighted lever $H^2$ until moved entirely clear of the grooved portion of the block H' into the position shown in Fig. 6, and the upper end $h^3$ is released from the grooved block H', so that the lever H can be returned into normal position and follow the weight of the deflector G, which latter is returned by gravity into its normal vertical position. (Shown in full lines in Figs. 1 and 2.) The return motion of the deflector G also returns the weighted lever H into normal position. As the platform E' is returned into normal position at the lower end of the weighing-box E before the return of the deflector into its normal position it is ready to receive the next supply of fibrous material. As the pin $i$ of the pulley $i'$ has in the meantime been released from the shank of the weighted lever $H^2$, the same is likewise returned into normal position ready for the next operation.

My improved weighing attachment not only interrupts the supply of fibrous material to the weighing device as soon as the required quantity is weighed off, but also interrupts the feeding of the fibrous material for a certain predetermined interval of time, so that the quantity weighed off and delivered to the machine is worked off before the next supply of fibrous material is delivered. This is an important feature, as thereby the weighed supply of fibrous material to the machine can be accurately and reliably timed according to the requirements of the machine.

Having thus described my invention, I claim as new and desire to secure by Letters Patent—

1. The combination, with means for feeding and means for weighing suitable material, of a deflector, mounted so as to guide the fed material to the weighing-platform or to deflect and return the surplus to the feeding means, upon the weighing of a predetermined quantity of material, means for moving the deflector in position for returning the surplus, and means, coöperating with the means for moving the deflector in position for returning the surplus, for maintaining the material-returning position of the deflector during the time between the completed weighing of the determined quantity of material and the unexpired portion of the interval, predetermined by a member independent of the weighing mechanism, when it is to be delivered to the hat-forming or other machine, substantially as set forth.

2. The combination, with means for feeding and means for weighing suitable material, of a gravitating deflector, arranged in the line of discharge from the feeding means to the weighing device and mounted to gravitate to or assume a position so as to guide the fed material to the weighing-platform or to deflect and return the surplus to the feeding means, upon the weighing of a predetermined quantity of material, means for instantaneously moving the deflector from its gravitating position to position for returning the surplus, and means, coöperating with the means for moving the deflector in position for returning the surplus, for maintaining the material-returning position of the deflector during the time between the completed weighing of the determined quantity of material and the unexpired portion of the interval, predetermined by a member independent of the weighing mechanism, when it is to be delivered to the hat-forming or other machine, substantially as set forth.

3. The combination, with means for feeding and means for weighing suitable material, of a gravitating deflector, suspended normally in its gravitating hanging position over the weighing-platform, means for moving the deflector from its gravitating position so as to deflect and return the surplus to the feeding means, upon the weighing of a predetermined quantity of material, and means, coöperating with the means for moving the deflector in position for returning the surplus, for maintaining the material-returning position of the deflector during the time between the completed weighing of the determined quantity of material and the unexpired portion of the interval, predetermined by a member independent of the weighing mechanism, when it is to be delivered to the hat-forming or other machine, substantially as set forth.

4. The combination, with means for feeding and means for weighing suitable material, of a deflector, means for instantly moving the deflector in position for returning the surplus material to the feeding means, upon the weighing of a predetermined quantity of material, and means, acting on the means for positively actuating the deflector, for maintaining the material-returning position of the deflector during the time between the completed weighing of the determined quantity of material and the unexpired time of the predetermined interval when it is to be delivered to the hat-forming or other machine, substantially as set forth.

5. The combination, with means for feeding suitable material, a weighing-platform and a scale-beam, whereby predetermined quantities are weighed off, of a shiftable deflector, a fulcrumed and weighted lever in addition to said scale-beam and connected with said deflector, and mechanism for controlling the motion of said deflector-operating lever, substantially as set forth.

6. The combination, with a device for feeding fibrous material and a device for weighing the same, of an oscillating deflector located above the weighing device, a weighted lever connected with the deflector, a grooved block on said weighted lever, a fulcrumed and weighted lever adapted to engage said block, and means for intermittently moving the fulcrumed lever into engagement with said block so as to retain the same and the deflector in fixed position for a certain period of time, substantially as set forth.

In testimony that I claim the foregoing as my invention I have signed my name in presence of two subscribing witnesses.

PIERRE C. WARING.

Witnesses:
PAUL GOEPEL,
M. HENRY WURTZEL.